T. M. PEERY.
BRAKE APPARATUS.
APPLICATION FILED MAR. 22, 1915.
1,162,805.  Patented Dec. 7, 1915.
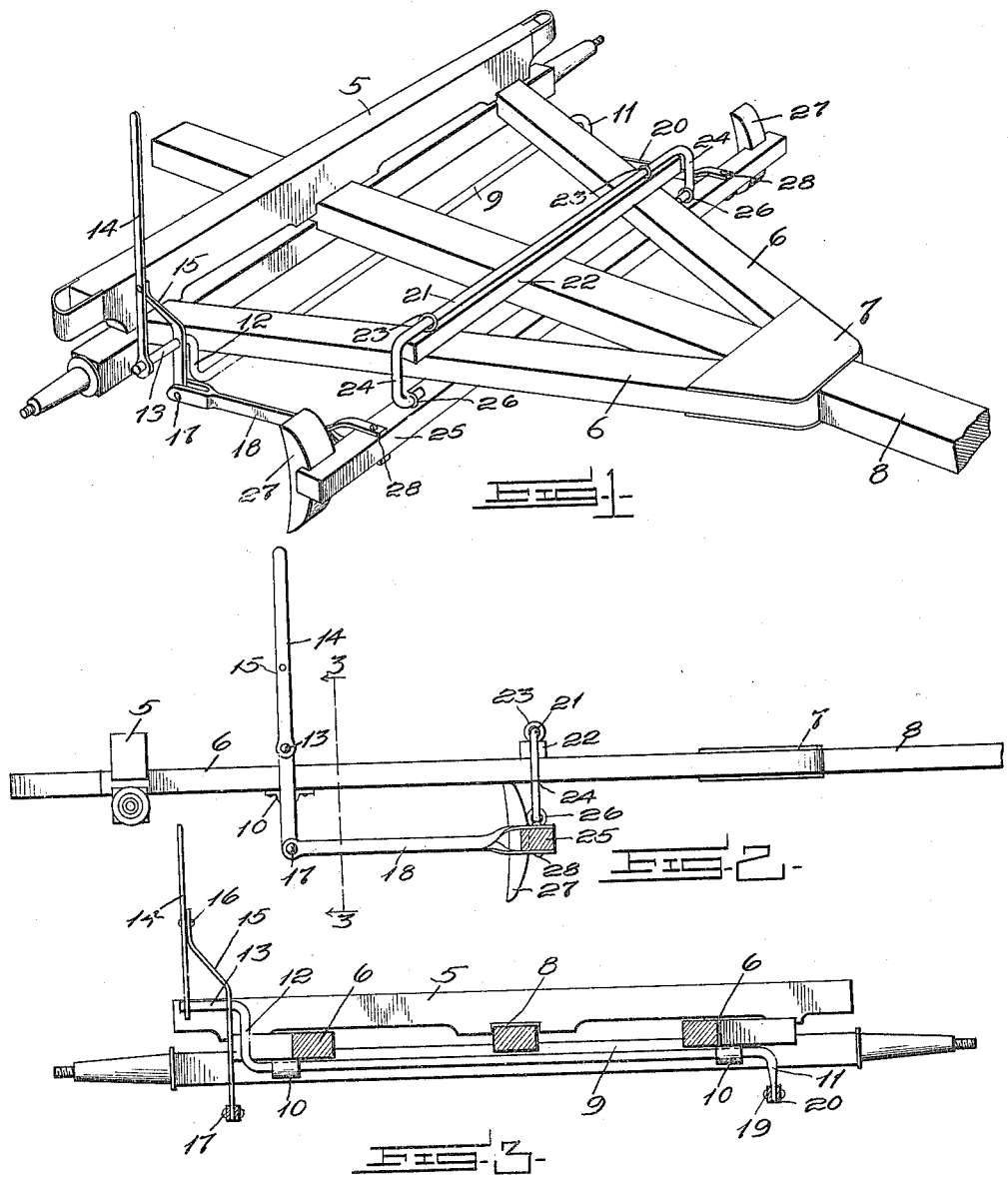

UNITED STATES PATENT OFFICE.

THOMAS M. PEERY, OF PIKEVILLE, KENTUCKY.

BRAKE APPARATUS.

1,162,805.  Specification of Letters Patent.  Patented Dec. 7, 1915.

Application filed March 22, 1915.  Serial No. 16,216.

*To all whom it may concern:*

Be it known that I, THOMAS M. PEERY, a citizen of the United States, residing at Pikeville, in the county of Pike and State of Kentucky, have invented certain new and useful Improvements in Brake Apparatus; of which the following is a specification.

My invention relates to improvements in brake apparatus for vehicles, such as wagons, automobiles or the like.

An important object of the invention is to provide means for increasing the leverage of the manually operated element of the apparatus whereby the brakes are set with a high degree of pressure.

A further object of the invention is to provide apparatus of the above mentioned character which is simple in construction, strong, durable, convenient in use, and inexpensive to manufacture.

A further object of the invention is to provide apparatus of the above mentioned character adapted to equalize the pressure applied to the brake devices or shoes.

Other objects and advantages of the invention will be apparent during the course of the following description.

In the accompanying drawings forming a part of this specification and in which like numerals are employed to designate like parts throughout the same, Figure 1 is a perspective view of apparatus embodying my invention, Fig. 2 is a side elevation of the same, and, Fig. 3 is a transverse sectional view taken on line 3—3 of Fig. 2.

In the drawings, wherein for the purpose of illustration is shown a preferred embodiment of my invention, the numeral 5 designates a rear bolster of a wagon or other vehicle, to which are secured hounds 6, connected at their forward end by a box 7, as is customary.

The numeral 8 designates the usual pole or reach.

The numeral 9 designates a horizontal rock-shaft included in my brake apparatus, which is journaled through bearings 10, rigidly secured to the hounds 6, as shown. This rock-shaft, as more clearly shown in Fig. 3, is provided at one end with a depending crank 11 and at its opposite end with an upstanding crank 12, carrying a horizontal extension 13.

The numeral 14 designates a swinging operating lever, the lower end of which is apertured for pivotally receiving the horizontal extension 13. A lever extension or strap 15 is rigidly secured to the lever 14 above its pivot, as shown at 16, and is apertured between its ends for pivotally receiving the horizontal extension 13, as shown. The lever extension 15 projects downwardly below the horizontal extension 13 for a substantial distance, and has pivotal connection, as shown at 17, with the preferably forked rear end of a pitman or link 18, extending forwardly for a purpose to be described. The depending crank 11 has pivotal connection, as shown at 19, with the preferably forked rear end of a pitman or link 20, extending forwardly for a purpose to be described.

The numeral 21 designates a suspension rock-shaft, pivotally connected with a transverse bar 22, by means of eye bolts 23 or the like. This rock-shaft 21 carries depending cranks 24, the ends of which are pivotally connected with a transverse brake bar 25 by means of eye bolts 26 or the like. At its ends, the brake bar 25 carries brake shoes 27, to engage with the rear wheels of the wagon, (not shown). The forward ends of the pitmen or links 18 and 20 are preferably forked and suitably connected with the brake bar 25 by means of bolts 28 or the like.

It is to be understood that the invention is not restricted to the use of the shoes 27 as brake devices, as the links 18 could be connected with other brake devices, such as brake bands, ordinarily employed upon automobiles. The term "brake devices" employed in the claims is intended to cover brake bands, and other brake devices, as well as brake shoes.

The operation of the apparatus is as follows: When the lever 14 is swung forwardly the same turns upon the horizontal extension as a pivot, whereby its lower end is moved rearwardly and the pitman 18 moved rearwardly to effect a corresponding movement of the adjacent end of the brake bar. Simultaneously with this movement of the lever, the crank 12 is swung forwardly, whereby rock-shaft 9 is turned and the crank 11 swung rearwardly. This movement of the crank 11 moves the link 20 rearwardly for effecting a corresponding movement of the adjacent end of the brake bar. In this manner both ends of the brake bar are simultaneously moved rearwardly to bring the brake shoes into engagement with the wheels. I have found that by the system of levers employed, that the brake shoes may be made to engage the wheels with a high degree of pressure, upon the manual operation of the lever 10 by a single operator.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In brake apparatus of the character described, a rock-shaft provided with oppositely extending cranks, a swinging lever pivotally mounted upon one crank and extending downwardly beyond the same for a substantial distance, a brake bar carrying brake shoes, means connecting the lower end of the lever with the adjacent end of the brake bar, and means connecting the other crank with the adjacent end of the brake bar.

2. In brake apparatus of the character described, a rock-shaft provided at one end with a depending crank and at its opposite end with an upstanding crank having a substantially horizontal extension, a shoe carrying brake bar, a swinging lever pivotally mounted upon the horizontal extension and extending downwardly beyond the same for a substantial distance, a relatively nonextensible element connecting the lower end of the lever and brake bar, and a second relatively nonextensible element connecting the depending crank and brake bar.

3. In brake apparatus of the character described, a rock-shaft provided with cranks, a swinging lever pivotally connected with one crank and extending downwardly beyond its pivot for a substantial distance, brake devices, means connecting the other crank with one brake device, and means connecting the lower end of the lever with the other brake device.

4. In brake apparatus of the character described, a plurality of cranks, means whereby the cranks turn together, a swinging lever pivotally connected with one crank to be supported thereby and turn in substantially the plane of such crank, brake devices, means connecting the other crank with one brake device, and means connected with the lever at a point spaced a substantial distance from its pivot and connected with the other brake device.

5. In apparatus of the character described, a rock-shaft provided at its ends with cranks, brake devices arranged near the cranks, a member connecting one crank with the corresponding brake device, an operating lever pivotally mounted upon the other crank, and a member connecting the operating lever with the other brake device.

6. In a wagon brake, the combination with a roller bar having a crank portion on one end thereof and an arm on the other end, of a brake beam, a lever pivotally mounted on said crank portion and having an integral arm through which said crank portion extends, and links connected to said arms and to the brake beam.

In testimony whereof I affix my signature in presence of two witnesses.

THOMAS M. PEERY.

Witnesses:
 J. B. DESKINS,
 C. DANA MAY.

Copies of this patent may be obtained for five cents each, by addressing the "Commissioner of Patents. Washington, D. C."